United States Patent
Dacus et al.

[15] 3,665,693
[45] May 30, 1972

[54] MOWER GUARD

[72] Inventors: Herbert R. Dacus, 1089 Madrid, Rockledge, Fla. 32955; Harry V. Christner, 795 Newfound Harbour Drive, Merritt Island, Fla. 32952

[22] Filed: Mar. 23, 1971

[21] Appl. No.: 127,280

[52] U.S. Cl. ............................................56/320.1, 56/255
[51] Int. Cl. ...................................................A01d
[58] Field of Search..............56/17.4, 16.6, 17.5, 255, 320.1, 56/320.2, DIG. 24

[56] References Cited

UNITED STATES PATENTS

| | | | |
|---|---|---|---|
| 2,539,779 | 1/1951 | Grosso | 56/16.6 |
| 2,906,082 | 9/1959 | Mathis | 56/320.1 |
| 2,934,882 | 5/1960 | Kaut, Jr. | 56/320.1 |
| 3,038,289 | 6/1962 | Gross | 56/255 |
| 3,312,049 | 4/1967 | Walker | 56/255 |

*Primary Examiner*—Russell R. Kinsey
*Attorney*—Clarence A. O'Brien and Harvey B. Jacobson

[57] ABSTRACT

A guard or safety shield comprising a plurality of laterally spaced parallel rods mounted beneath the rotary blade of a rotary lawn mower in a manner so as to define uninterrupted longitudinal grass paths. Each rod has the forward end thereof suspended from the overlying housing front wall by a narrow generally vertical member, these members acting to maintain the grass upright and guide the grass into the grass paths. The front wall of the mower has an elevated lower edge with the rotary blade being located at a height approximately midway between the lower edge of the front wall and the underlying guard rods.

8 Claims, 4 Drawing Figures

Patented May 30, 1972

3,665,693

Herbert R. Dacus
Harry V. Christner
INVENTORS

BY Clarence A.O'Brien
and Harvey B. Jacobson
Attorneys

MOWER GUARD

The present invention generally relates to rotary lawn mowers, and is more particularly concerned with a safety guard for such mowers and the unique manner of combining the guard with the mower housing so as to achieve full protection without impairment of the cutting ability of the mower.

It is a primary intention of the instant invention to provide a mower mounted safety guard for rotary lawn mowers which constitutes a significant improvement over the mower guards heretofore devised. More specifically, while various types of generally similar mower guards are known in the prior art, such known guards incorporate features which make them a less than satisfactory product. For example, certain ones of the guards are loosely mounted, for example by a suspension spring or the like which in itself introduces a safety hazard. Other guards incorporate crossbars or irregularly shaped mower traversing rods which reduce the cutting ability of the mower. Still other guards require elaborate mounting and preclude easy servicing of either the mower or the guard itself.

In overcoming the above objectionable features, the guard of the instant invention provides for a secure mounting to the mower housing in conjunction with the ability to readily remove either the entire guard or portions thereof for selective servicing as required. In addition, the guard of the instant invention allows for a free flow of the grass to the cutting blade whereby the operation of the mower is not affected in any manner. Likewise, the guard is so constructed as to enable an orientation of the mower housing, blade and guard whereby a greater exposure of the blade to the grass is effected while at the same time providing a safety enclosure about the blade so as to preclude either damage to the blade or to the operator of the mower.

Basically, the guard of the instant invention includes front to rear rods extending in free laterally spaced parallel relation to each other. Each rod is individually mounted at the front end thereof by a substantially vertical member which extends upwardly from the rod and to the overlying housing front wall, the lower edge of this front wall being orientated in a manner whereby the rotary blade itself is positioned at approximately mid-height between the lower edge of the front housing wall and the underlying guard rods. The individual rods are preferably slidably received through the front members and releasably bolted to a rear plate whereby removal of the individual rods, as desired, can easily be effected.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
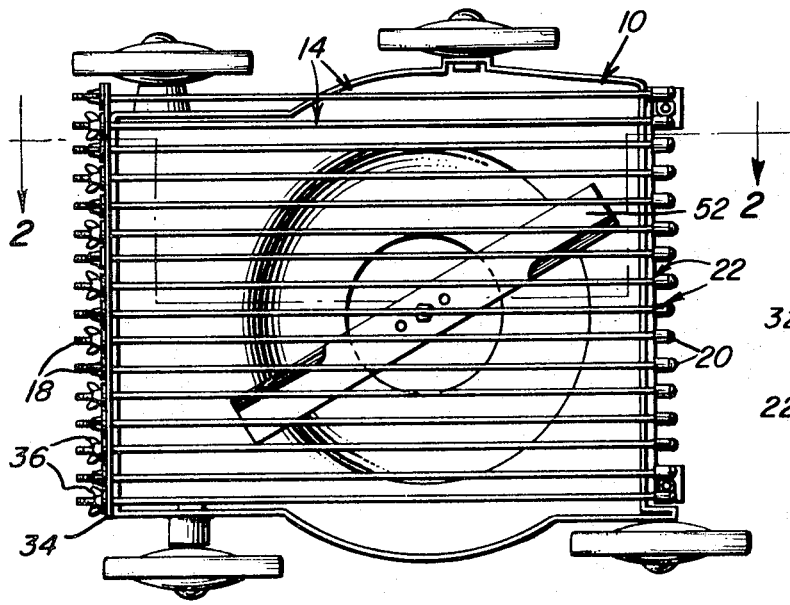
FIG. 1 is a bottom plan view of a mower with the guard of the instant invention mounted thereon.

Referring now more specifically to the drawings, reference numeral 10 is used to generally designate the safety guard of the instant invention, with reference numeral 12 designating a rotary mower of any conventional construction upon which the guard 10 is to be mounted.

The guard 10 consists basically of a plurality of elongated rigid parallel rods 14 which are to underlie the mower housing 16 and extend from front to rear therebeneath. Each of the rods 14 has a threaded rear end portion 18 and an enlarged rounded head 20 on the forward end thereof. A vertically elongated support member 22 is associated with the forward end of each of the rods 14. Each of the support members 22 has a gradually thickening forwardly inclined lower portion 24 including a rod receiving passage therethrough. The individual members 22 in turn have the upper end thereof affixed to a transverse rod 26, the opposite ends of which incorporate forwardly projecting lugs 28. These lugs 28, in mounting the guard, underlie and are bolted to similar lugs or ears 30 affixed to and projecting forwardly from the front wall 32 of the mower housing 16.

The rods 14 are mounted on their respective vertical members 22 by a longitudinal extending of each rod 14 through the hole provided in the lower end portion of the respective vertical member 22 until the enlarged rounded head 20 engages against the inclined forward face of the lower portion 24 of the member 22. The threaded rear end 18 of the rod is extended through a transverse bar 34 to which it is releasably locked by an appropriate wing nut 36 and, if desired, lock washer 38. The bar 34 is in turn provided with upwardly directed end brackets 40 which releasably bolt to a pair of rearwardly directed lugs or ears 42 provided on the vertically depending rear wall 44 of the housing 16. Incidentally, as will be readily appreciated, the housing 16 also incorporates a horizontal blade overlying deck 46 and opposed blade enclosing side walls 48.

Figure 3:
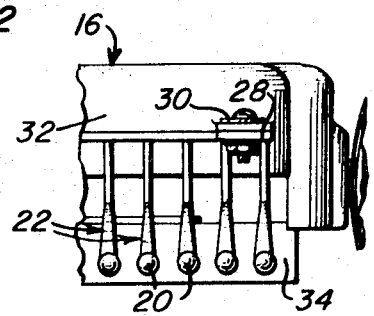
FIG. 3 is an enlarged front elevational view of a portion of the mower mounted guard.
Figure 2:
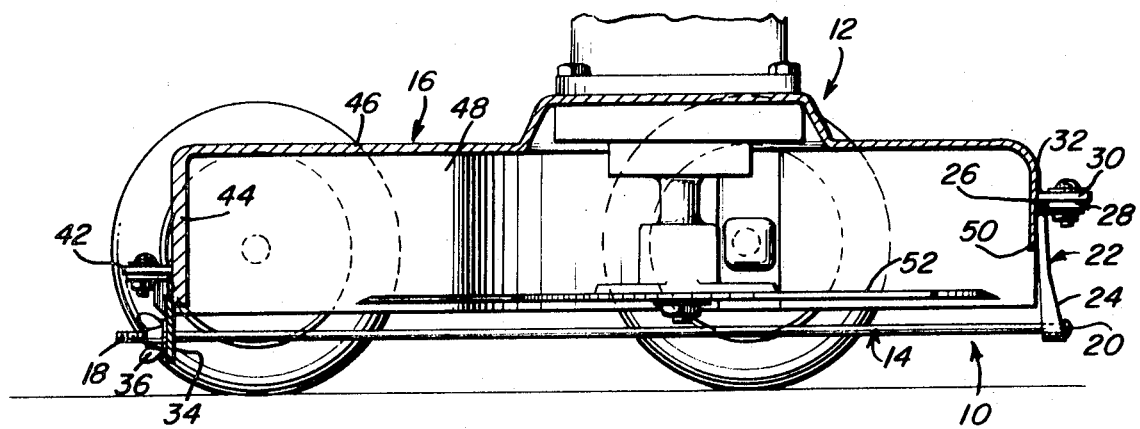
FIG. 2 is an enlarged cross-sectional view taken substantially on a plane passing along line 2—2 in FIG. 1.
Figure 4:
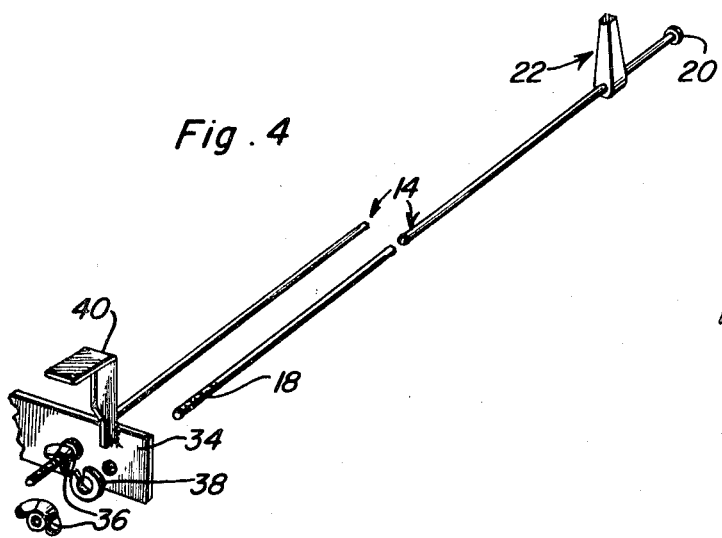
FIG. 4 is an exploded perspective detail of the guard construction.

As will be appreciated, the entire guard 10, when assembled, is mounted to the mower housing 16 by a rigid bolting thereof to the housing 16 at four points generally corresponding to the four corners of the guard 10. With reference to FIG. 2 and 3 in particular, it will be noted that the lower edge 50 of the front wall 32 is elevated relative to the lower edges of the side and rear walls 48 and 44. This is done so as to enable a positioning of the rotary blade 52 in a plane below this lower forward edge 50 and at a height approximately midway between the front wall edge 50 and the underlying guard rods 14. In this manner, free movement of the grass into the housing and the path of the rotary blade 52 is provided for with the depending rigid support members 24 guarding completely against the introduction of foreign objects, such as stones, bottles, or the like, while in no way affecting the movement of the grass to the blade 52, and in fact enhancing such movement through a tendency to guide the grass along longitudinal paths into the mower housing 16. The depending upper portion of the front wall 32 is retained in that such is essential in order to insure a proper throw out or discharge of the cut grass in the conventional manner. In order to enhance the ability of the forward portion of the guard 10 to receive and guide the grass into the blade enclosing housing 16, it is contemplated that each of the support members 22, in addition to having the tapered enlarged lower portion 24, be inclined slightly forwardly, providing in effect, with the rounded rod head 20, a leading lower corner.

As mentioned previously, of particular significance with regard to the safety guard of the instant invention is the fact that the grass accommodating paths are provided along the full length of the cutting portion of the mower with the front of the guard, aside from the vertical support or guide members 24, being completely open. The rods 14 are in laterally spaced parallel orientation relative to each other and completely independent of each other, other than for the rear connecting bar 34. The fact that the rods 14 are straight avoids any deflection, bending or twisting of the grass such as could adversely affect the cutting action of the blade. By the same token, no intermediate crossbars or rods are provided to bend or otherwise misalign the grass prior to the cutting thereof. The front support members 22, while narrow, are relatively thick from front to rear and provide a rigid mount for the forward rod ends. The rear crossbar 34 provides a secure mount for the rear ends of the individual rods 14 with the rods 14 themselves being rigid, and when secured in position, being capable of effectively excluding foreign objects, and in fact passing over such objects without sustaining damage.

The fact that each of the rods 14 is individually mounted is significant in that the individual rods can be easily replaced as required without requiring a dismantling of the entire guard 10. By the same token, should access be required to a portion of the interior of the housing, for example in order to service the blade 52, selected rods can be quickly and easily removed, again without requiring a removal of the entire guard.

The guard 10, notwithstanding the unique advantages residing therein, is of a basically simple construction and capable of being economically produced. Likewise, the guard is particularly adapted for shipment in a disassembled condition, is easily assembled, and readily adapted for mounting on any conventional mower. Incidentally, while the guard has been illustrated as mounting on laterally projecting ears affixed to the mower housing 16, it will be appreciated that other equally simple mountings can be provided. For example, vertical ears can be provided on the four corners of the guard for a direct bolting to the front and rear housing walls 32 and 44. Further, if deemed advisable, the guard can be formed as an integral unit while retaining the close lateral spacing between the rods 14 and the completely independent nature of the rods and their associated forward support members 22 between the front connecting cross rod 26 and the rear transverse plate 34. Such a construction, while retaining the highly desirable full length grass guiding channels would of course not incorporate the desirable feature of individually replaceable rods.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows

1. A rotary lawn mower and safety guard therefor, said mower comprising a horizontal rotary blade, a housing enclosing said blade, said housing including a deck overlying said blade in spaced relation thereabove, and peripheral depending front, rear and side walls, said front wall terminating in a lower edge vertically above the plane of the blade, said guard comprising a plurality of laterally spaced vertically orientated grass guiding members depending from said front wall to a point below said blade, a plurality of straight horizontal rods underlying said blade, one of said rods being associated with each vertical member, each rod having the forward end thereof fixed to the lower end of the corresponding vertical member, front mounting means mounting the upper ends of said vertical members on said housing, and rear mounting means mounting the rear ends of said rods on said housing.

2. The construction of claim 1 wherein said rods and associated vertical members define continuous, open and uninterrupted straight grass guiding paths between the front wall lower edge and the rear mounting means.

3. The construction of claim 2 wherein each vertical member, in combination with the forward end of the associated rod, presents a forwardly extending lower corner.

4. The construction of claim 3 wherein each rod is individually removable from the associated vertical member and rear mounting means.

5. The construction of claim 4 wherein each vertical member includes a hole transversely therethrough, said rod being extensible through said hole, said rod including an enlarged forward end thereof which engages against the forward side of the vertical member, said rear mounting means comprising a transverse bar having an aperture therethrough for each rod, each rod having a threaded rear end portion received through the associated aperture, and nut means threaded on said rod for a retention thereof.

6. The construction of claim 2 wherein each rod is individually removable from the associated vertical member and rear mounting means. upwardly 7. For use in conjunction with a rotary grass mower, a safety guard therefor, said safety guard including a plurality of straight elongated laterally spaced parallel rods, said rods having front and rear ends, a vertical member affixed to the front end of each rod and extending upwardly therefrom, means interconnecting the upper ends of said vertical members, and means affixed to and interconnecting the rear ends of said rods, said rods and associated vertical members defining straight continuous uninterrupted paths between the interconnected upper ends of the vertical members and the interconnected rear ends of the rods.

8. The guard of claim 7 wherein each rod is releasably affixed to the associated front vertical member and the means interconnecting the rear ends of the rods.

* * * * *